(No Model.)
E. CONKLIN & C. E. FOWLER.
Cream Measure.
No. 242,433. Patented June 7, 1881.
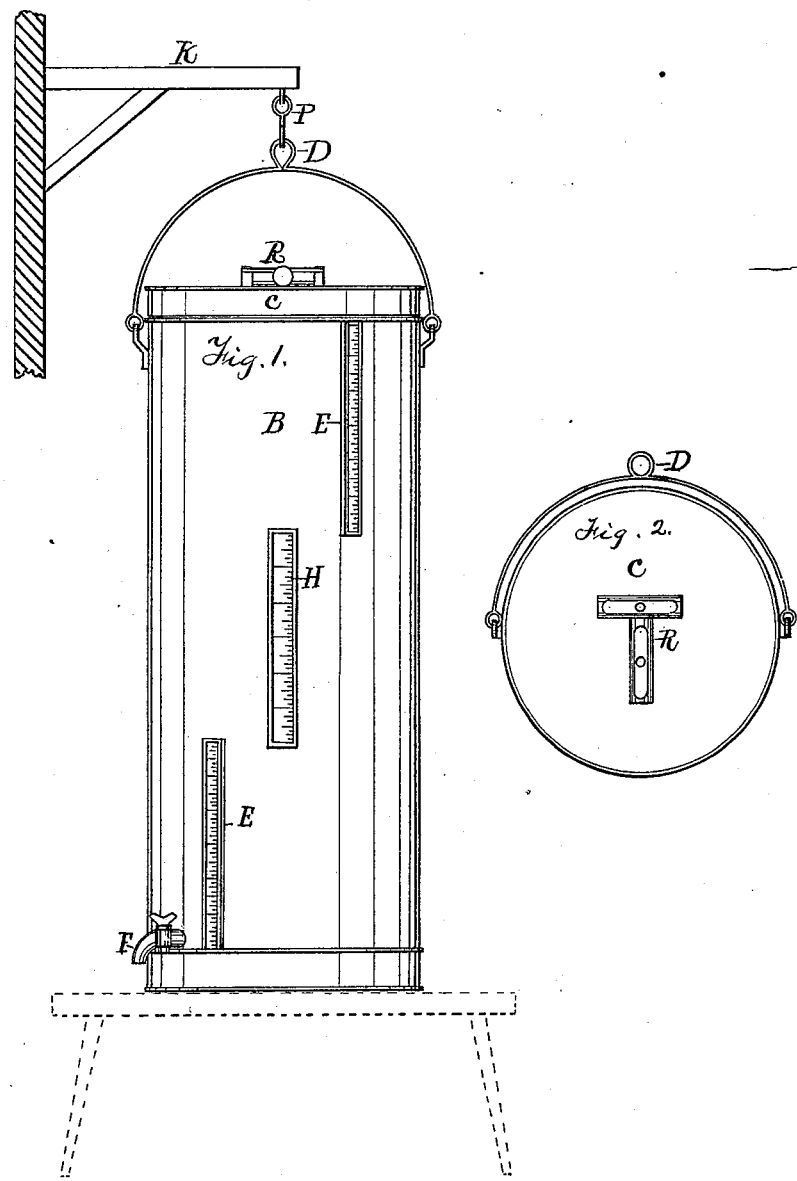
Witnesses
Thos H Hutchins
Wm J Hutchins
Inventors
Edward Conklin
Charles E. Fowler

UNITED STATES PATENT OFFICE.

EDWARD CONKLIN AND CHARLES E. FOWLER, OF CHANNAHON, ILLINOIS.

CREAM-MEASURE.

SPECIFICATION forming part of Letters Patent No. 242,433, dated June 7, 1881.

Application filed March 11, 1881. (No model.)

*To all whom it may concern:*

Be it known that we, EDWARD CONKLIN and CHARLES E. FOWLER, of Channahon, in Will county, and State of Illinois, have invented a Device for Measuring Cream and other Liquids, the construction and operation of which we will proceed to explain, reference being had to the annexed drawings, and the letters and figures thereon, making a part of this specification, in which—

Figure 1 is a side elevation, and Fig. 2 a plan view on the top.

The nature of this invention consists in the use of a can or receptacle provided with a transparent scale extending from the bottom to the top in the side of the can, so that the quantity of fluid in the can can be accurately indicated by the scale in the side, no matter how much or little the can contains; and also in providing the can with spirit-levels, so as to ascertain when the can stands level, so it will measure accurately, and also with means for suspending the can from above, so it will hang plumb, for the same purpose.

The device is intended to be used by a farmer in connection with a creamery, now so common in this country. The farmer generally saves the cream that collects on the milk over night, and in the morning skims it off and puts the cream into such a measuring-can as we describe. When the collector calls for the cream he takes it from this receptacle and gives the farmer credit for the amount indicated as being in it by the scale, thus saving time to measure it by other means. However, the device may be used for measuring any other liquid desired.

In the drawings, B is the can or receptacle proper, in which the liquid to be measured is placed. The can B has its side pierced by openings E, and the openings closed by a transparent substance, preferably glass, which is marked by the scale H. These openings E are arranged apart from each other, as is shown in Fig. 1, so the top of one reaches as high as the bottom or lower end of the one above, so that, together, they form a continuous scale from the bottom to the top of the can. They are arranged in sections apart from each other, so the can will not spread apart in consequence of having one long continuous slit cut in its side.

The top of the can B has a bail, D, from which the can can be suspended from a hook, P, above, so as to cause it to stand or hang plumb; also, it has arranged on the top of the lid c the spirit-levels R, so that when the can rests on the floor or a bench, as is shown in Fig. 1, it can be made to stand plumb, as it must stand plumb to measure accurately. These levels are preferably placed on the top of the lid or cover, but may be placed on any other part of the can, if desirable.

We are aware of scales being used on the side of a glass can or bottle, marked or cut thereon, running from top to bottom to measure with; but we are not aware of the use of a scale in sections inserted in openings cut in or through the side of a metal or opaque can in the diagonal manner set forth, so that, taken together, they form a continuous scale without weakening the can materially, no matter how tall the can may be, as any number of these openings E may be made through the sides of the can.

The faucet F, at the bottom of the can near the scale, is for the purpose of drawing off the liquid.

Having thus described our invention, what we claim as new, and desire to secure by Letters Patent, is as follows, to wit:

1. In a measuring-can, the sectional longitudinal openings E, arranged apart from each other to leave a portion of the can uncut for strength, said openings being provided with the scale H and forming conjointly an opening and scale from the bottom to the top of the can, for the purpose set forth.

2. In a measuring-can, the spirit-levels R, arranged on the can, as and for the purpose set forth.

3. The measuring-can described, having vertical scales, in combination with leveling devices, substantially as shown and described, for the purpose set forth.

EDWARD CONKLIN.
CHARLES E. FOWLER.

Witnesses:
CALEB FOWLER,
FRANK D. FOWLER.